(12) United States Patent
Verghese et al.

(10) Patent No.: US 8,270,599 B2
(45) Date of Patent: Sep. 18, 2012

(54) TRANSPARENT PROTOCOL INDEPENDENT DATA COMPRESSION AND ENCRYPTION

(75) Inventors: Manoj Verghese, Ottawa (CA); Behrouz Nikpour, Gloucester (CA); Andrew E. S. MacKay, Nepean (CA)

(73) Assignee: Ciena Corporation, Linthicum, MD (US)

( * ) Notice: Subject to any disclaimer, the term of this patent is extended or adjusted under 35 U.S.C. 154(b) by 1170 days.

(21) Appl. No.: 12/039,118

(22) Filed: Feb. 28, 2008

(65) Prior Publication Data

US 2009/0220073 A1   Sep. 3, 2009

(51) Int. Cl.
 *H04L 29/06* (2006.01)
(52) U.S. Cl. ............... 380/29; 713/153; 370/463
(58) Field of Classification Search .......... 713/153; 380/29; 370/463
See application file for complete search history.

(56) References Cited

U.S. PATENT DOCUMENTS

| | | | | |
|---|---|---|---|---|
| 6,182,149 B1* | 1/2001 | Nessett et al. | 709/247 |
| 6,618,385 B1* | 9/2003 | Cousins | 370/401 |
| 6,782,473 B1* | 8/2004 | Park | 713/160 |
| 6,970,943 B1* | 11/2005 | Subramanian et al. | 709/238 |
| 7,733,913 B1* | 6/2010 | Cheung et al. | 370/474 |
| 2002/0069317 A1* | 6/2002 | Chow et al. | 711/104 |
| 2002/0103943 A1* | 8/2002 | Lo et al. | 710/2 |
| 2004/0085904 A1* | 5/2004 | Bordogna et al. | 370/236 |
| 2004/0114622 A1* | 6/2004 | Nation et al. | 370/465 |
| 2004/0131087 A1* | 7/2004 | Stevens et al. | 370/498 |
| 2005/0053064 A1* | 3/2005 | Wang | 370/389 |
| 2005/0278565 A1* | 12/2005 | Frattura et al. | 714/5 |
| 2006/0013240 A1* | 1/2006 | Ma et al. | 370/401 |
| 2007/0116046 A1* | 5/2007 | Liu et al. | 370/466 |
| 2007/0277084 A1* | 11/2007 | Oren | 714/808 |
| 2008/0177864 A1* | 7/2008 | Minborg et al. | 709/219 |
| 2008/0181394 A1* | 7/2008 | Keefe et al. | 380/28 |

* cited by examiner

*Primary Examiner* — Jeffrey Pwu
*Assistant Examiner* — Michael D Anderson
(74) *Attorney, Agent, or Firm* — Christopher & Weisberg, P.A.

(57) ABSTRACT

A network interface includes at least one physical memory, at least one client port, at least one processor accessing the at least one physical memory, and at least one network port. The client port receives data blocks which contain a quantity of bits from at least one first client computer system. The processor temporarily stores the data blocks in the at least one physical memory. The processor interacts with the physical memory and compresses the data blocks to reduce the quantity of bits. The processor further interacts with the physical memory such that the compressed data blocks are encrypted to produce encrypted frames. The at least one network port transmits the encrypted frames across a communication network.

18 Claims, 6 Drawing Sheets

TRANSPARENT PROTOCOL INDEPENDENT DATA COMPRESSION AND ENCRYPTION

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates generally to a method and system for line-rate compression and encryption of data and more specifically to a method and system for providing independent compression and encryption of service provider or enterprise customer data as a single, self-contained unit, regardless of protocol type.

BACKGROUND OF THE INVENTION

The ability to send and receive data over network connections has become a necessary and expected commodity of everyday life. Personal and business uses for data communication continue to grow almost daily, with the Internet becoming an integral part of our daily routine. With the advent of on-demand video and downloadable audio as well the increased number of new users placing demand on network service providers and enterprise customers, the need to provide increased speed and reliability for data transfer is an ongoing concern. As more people and businesses actually conduct transactions over public networks, virtual private networks, and intranets that use service provider facilities, service providers must continue to improve encryption procedures to insure that the transferred data cannot be recovered by hackers or other persons having improper motives.

One means of increasing data throughput is to compress the outgoing data packets before transmission on the network. Thus, the quantity of data traversing the network, i.e., the actual number of bits, is reduced while retaining the content of the data. Currently, to implement data compression and encryption methods, the service provider must purchase one piece of equipment, e.g., a compressor/decompressor, to perform the compression and a second, separate piece of equipment, e.g., an encryptor/decryptor, installed serially with the first piece of equipment, to perform the encryption. Each piece of equipment has its own associated power, memory, network interfaces, management, training, cabling and cost requirements. Typically, data received from a client computer is compressed by the compressor, then transmitted to the encryptor through at least one cable. Some measurable quantity of transmission line losses, delays, and noise/jitter problems are incurred by having to route the data through two separate devices, thereby diminishing the achievable data quality.

Additionally, as the need for speed increases, the number of available transport protocols, e.g., Ethernet, Ten Gigabit Ethernet, Synchronous Optical Networking ("SONET"), Synchronous Digital Hierarchy ("SDH"), etc., is also increasing. Thus, many service providers must install protocol converters to transform incoming data from one protocol to another.

Therefore, what is needed is a single, integrated device to perform independent compression and encryption of service provider or enterprise customer data regardless of protocol type.

SUMMARY OF THE INVENTION

The present invention advantageously provides a method, network interface device, and field programmable device for performing independent compression and encryption of service provider or enterprise customer data regardless of protocol type. Generally, the present invention advantageously provides a single, integrated device to perform the compression and encryption methods, thereby reducing the overall system cost and complexity, while increasing efficiency.

One aspect of the present invention includes a network interface device including at least one physical memory and at least one processor accessing the physical memory. The processor receives data blocks from a first client computer system and temporarily stores the data blocks in the at least one physical memory. Each of the data blocks contains a quantity of bits. The processor interacts with the physical memory and compresses the data blocks to reduce the quantity of bits and produce compressed data blocks. The processor interacts with the physical memory and encrypts the compressed data blocks to produce encrypted frames. The encrypted frames are transmitted to a communication network.

In accordance with another aspect, the present invention provides a method for preparing data for transportation over a communication network using a single device. The method includes receiving data blocks from a first client computer system in which each of the data blocks contains a quantity of bits. The method further includes compressing the data blocks to reduce the quantity of bits and produce compressed data blocks, encrypting the compressed data blocks to produce encrypted frames and transmitting the encrypted frames to a communication network.

In accordance with yet another aspect of the present invention, a field-programmable device, includes an ingress client interface, which receives data blocks containing a quantity of bits from a first client computer system. The field-programmable device also includes a compressor, communicatively coupled to the ingress client interface. The compressor compresses the data blocks to reduce the quantity of bits. An encryptor is communicatively coupled to the compressor and encrypts the compressed data blocks to produce encrypted frames. An ingress network interface, communicatively coupled to the encryptor, transmits the encrypted frames to a communication network.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
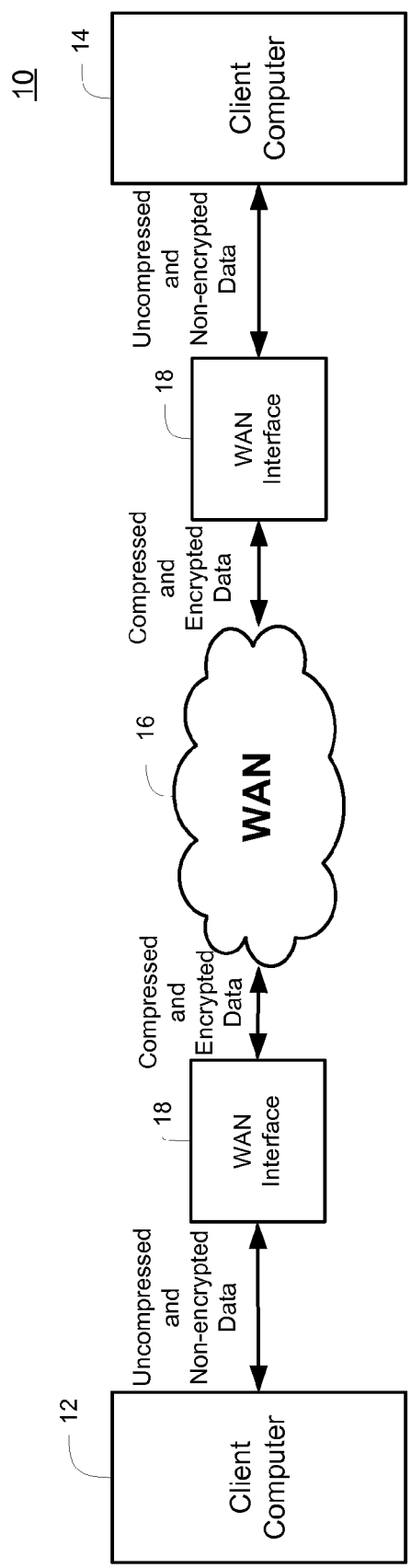
FIG. 1 is a block diagram of an exemplary data communication system constructed in accordance with the principles of the present invention.

Before describing in detail exemplary embodiments that are in accordance with the present invention, it should be observed that the embodiments reside primarily in combinations of apparatus components and processing steps related to implementing a system and method for providing independent compression and encryption of service provider or enterprise customer data as a single, self-contained unit, regardless of protocol type. Accordingly, the apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms, such as "first" and "second," "top" and "bottom," and the like, may be used solely to distinguish one entity or element from another entity or element without necessarily requiring or implying any physical or logical relationship or order between such entities or elements.

One embodiment of the present invention advantageously provides a method and wide-area network ("WAN") interface which performs data compression/decompression, transparent Generic Framing Procedure ("GFP-T") mapping/demapping, forward error correction, and encryption/decryptions in a single device. By combining the above features, multiple channels and functions are able to share resources such as memory and network interfaces, thereby reducing the overall system cost and complexity, while increasing efficiency. Additionally, these functions may be combined into a single processor or integrated circuit device, such as a field programmable gate array ("FPGA"), or application specific integrated circuit ("ASIC") which operates using one set of instructions, thus reducing the possibility of incompatibility between devices, while increasing developers' abilities to provide updates, feature enhancements and bug fixes. Furthermore, as these functions are now located within a single device, the cables interconnecting prior multiple devices are now eliminated, improving signal quality of the data, e.g., latency, loss, and jitter, and the aesthetic appearance of the device. Also, combining these functions into a single device reduces the amount of time required to setup and configure each device, and allows service personnel to receive training on a single device. Another advantage of the present invention is that the port or flow based architecture of the solution allows selective traffic to be compressed and or encrypted which is important for real-time applications like VOIP and Video which may already be compressed. The combination of functions in a single device also allows for aggregation of multiple compressed and or encrypted flows providing the ability to transmit more bits over a given WAN link than it is physically able to carry in bits per second.

Referring now to the drawing figures in which like reference designators refer to like elements, there is shown in FIG. 1, a data collection system constructed in accordance with the principles of the present invention and designated generally as "10." System 10 includes a first client computer 12 communicating with a second client computer 14 over a wide area network ("WAN") 16. The wide area network 16 may include the Internet, intranet, or other communication network. Each client computer 12, 14 transmits data through a WAN 16 via a WAN interface 18. Although the communication network is pictured in FIG. 1 as being a WAN, the principles of the present invention may also apply to other forms of communication networks, such as personal area networks ("PANs"), local area networks ("LANs"), campus area networks ("CANs"), metropolitan area networks ("MANs"), etc. Additionally, although FIG. 1 shows two client computers, this configuration is for exemplary purposes only. For example, the system 10 may include multiple WAN interfaces 18. The WAN interface 18 can be in communication with various types of client devices, such as routers, switches, etc.

Each WAN interface 18 compresses raw data received from the client computer 12, 14 and maps the compressed data into generic framing procedure ("GFP") frames using transparent GFP ("GFP-T") methods. The WAN interface 18 also inserts forward error correcting ("FEC") blocks into the data stream and encrypts the data using a 256 bit key before transmitting the data to the WAN 16. Each WAN interface 18 also performs the reverse functions whereby the WAN interface 18 receives encrypted data frames over the WAN 16, which are then unencrypted, forward error corrected, GFP demapped, and decompressed to match the data originally transmitted from the client computer 12, 14. Although each WAN interface 18 in FIG. 1 is shown as being connected to a single client computer 12, 14, the exemplary WAN interface 18 constructed in accordance with the principles of the present invention, supports up to four client computers 12, 14. The WAN interface 18 may be further enhanced to increase the number of client computers 12, 14 it is able to support without departing from the scope of the present invention.

Figure 2:
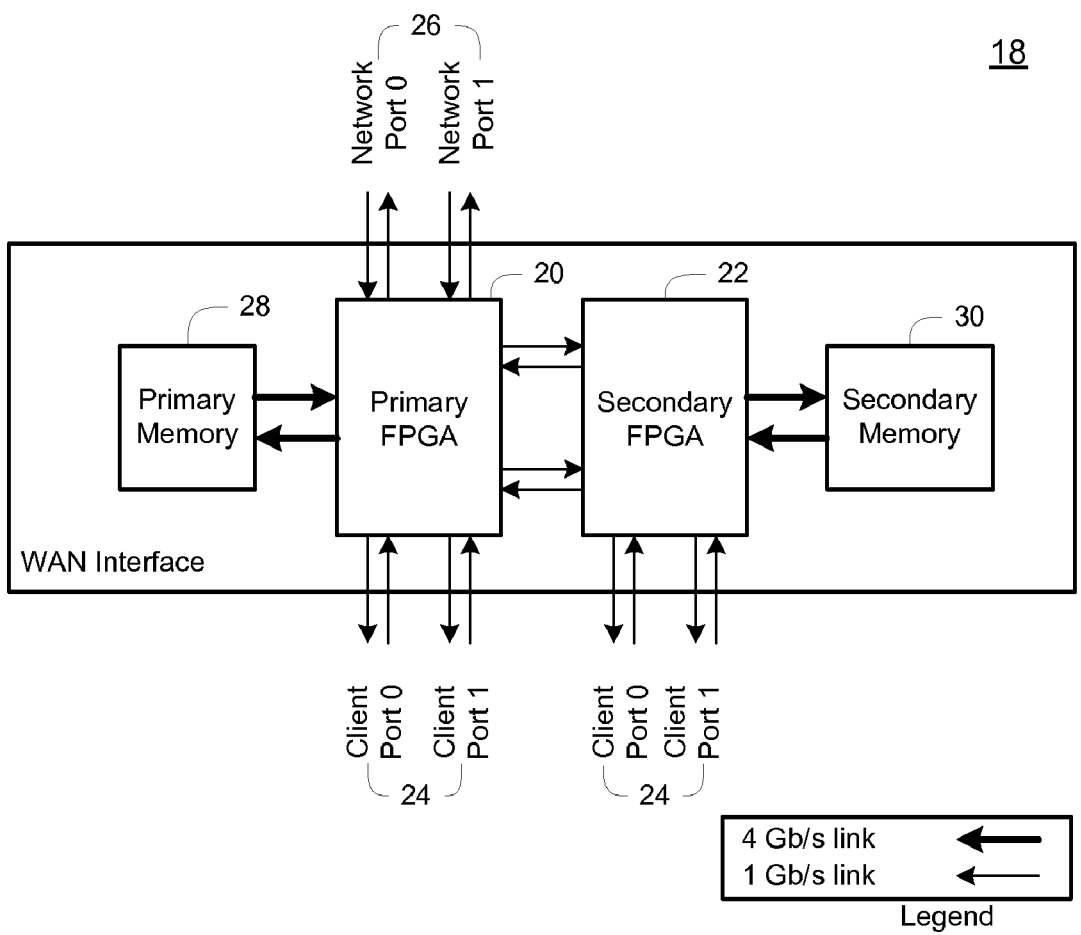
FIG. 2 is a block diagram of an exemplary wide area network interface constructed in accordance with the principles of the present invention.

Referring now to FIG. 2, a WAN interface 18 may include a primary FPGA 20 and a secondary FPGA 22. Each FPGA 20, 22 may include at least two bi-directional client ports 24 operating, for example, at a line rate of 1 Gb/s in each direction. Each FPGA 20, 22 may be identical devices, however only the primary FPGA 20 is in direct communication with the WAN 16 through two network ports 26. This configuration is based on the knowledge that customers typically want a device that has several client ports, but only one or two WAN ports. For example, the network interface device 18 may reside in a small office where each employee may have a connection into a client port. However, it should be noted that the network ports 26 on each FPGA 20, 22 are potentially fully functional. The second network port can be used for protection, i.e. a redundant path in case there is a failure on the first WAN port. Note that the failure could be of an equipment failure, i.e., the physical WAN port, or a network failure where the path over which WAN port 1 connects fails, e.g., due to an optical fiber cut. The second WAN port would be routed over a physically different network path. The value of having multiple client ports 24 concerns aggregation. Compression without aggregation has less value. The network interface device 18 multiplexes more than one physical client port to provide the most value to the service provider or enterprise. Without multiple client ports, the network interface device would not be able to interleave different protocols, e.g., Fibre Channel and Gigabit Ethernet, over a common WAN interface. Alternatively, the function of the two FPGAs 20, 22 could be incorporated into a single FPGA device, processor, or ASIC, or a combination thereof.

The primary FPGA 20 accesses a dedicated primary memory 28 and the secondary FPGA 22 accesses a dedicated secondary memory 30. The primary memory 28 and the secondary memory 30 may be duplicate physical devices. The bandwidth, i.e., data rate, between an FPGA 20, 22 and its associated external memory 28, 30 is four times greater than the bandwidth across each path of a client port 24. Thus, if the line data rate of a client port 24 is 1 Gb/s, then the data rate to/from the external memory 28, 30 is 4 Gb/s. This 4:1 ratio is merely exemplary, it being understood that other rates are possible depending on the availability/advancement of semiconductor technology, cost, design requirements, etc. Thus, the two bi-directional client ports 24 on each FPGA 20, 22, may share a single memory 28, 30. Additionally, each memory device may be shared between the ingress and egress directions, i.e., towards the network and towards the client for each given client port 24. Each single physical memory 28, 30 is therefore logically divided into four areas, i.e., one logical area for each data path of the two client ports 24.

Figure 3:
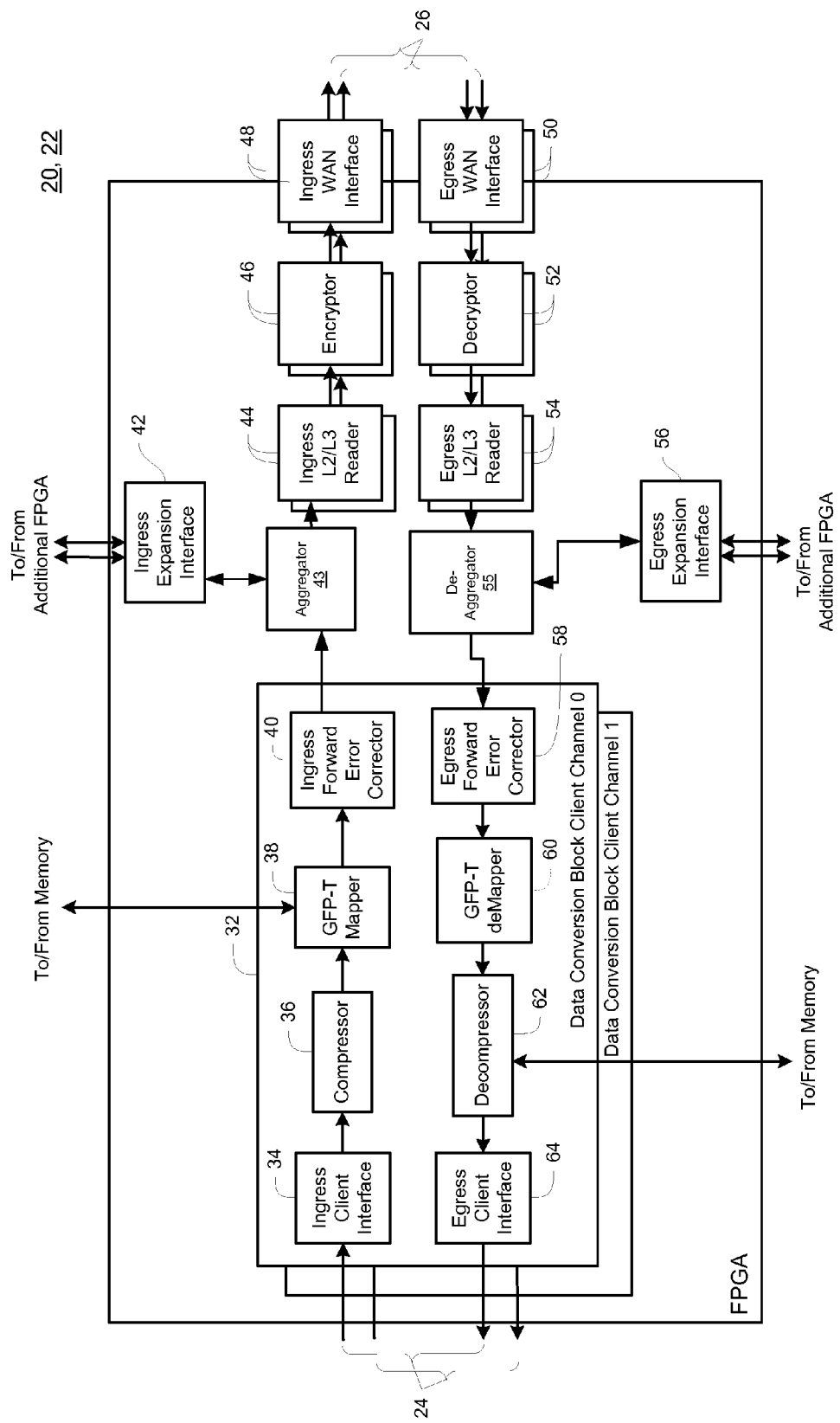
FIG. 3 is a block diagram of an exemplary field programmable gate array ("FPGA") constructed in accordance with the principles of the present invention.

FIG. 3 depicts a block diagram of an exemplary FPGA 20, 22 constructed in accordance with the principles of the present invention. Each FPGA 20, 22 may include at least two bi-directional, e.g., ingress and egress, data channels having a client port 24 and a network port 26. The ingress path is depicted in FIG. 3 as traversing from client to network, i.e., the upper path. The egress path is shown as flowing from network to client, i.e., the lower path.

In the ingress direction, clean, unencrypted data is received from a client port 24 by a data conversion block 32 which includes data processing functions prior to the encryption processes. The data conversion block 32 receives incoming data through an ingress client interface 34. The data is passed to a compressor 36 which reduces the overall bit count of the received data. Operation methods of the compressor are discussed in greater detail below. The compressed data then travels to a GFP-T Mapper 38 which compartmentalizes the compressed data into GFP frames in a well-known manner. The details of GFP mapping are beyond the scope of the present invention. A forward error corrector ("FEC") 40 groups the compressed data packets into FEC data blocks containing, for example, 2-10 data packets per FEC block. The FEC 40 inserts a forward error correction ("FEC") packet into each FEC data block, which allows for recovery of one missing packet per block at a receiving WAN interface 18. Details concerning the operation of the FEC 40 are discussed in greater detail below. The FEC 40 is the final stage of each data conversion block 32.

After exiting the data conversion block 32, the data flows to one of two paths depending upon whether the FPGA 20, 22 is operating as a primary FPGA 20 or as a secondary FPGA 22. If the FPGA is operating in a secondary function, the data is routed from the FPGA 22 to the primary FPGA 20 via an ingress expansion interface 42. Otherwise, if the FPGA is operating as a primary FPGA 20, data packets received from a secondary FPGA 22 are combined with data packets from the FEC 40 by an aggregator 43 and then routed through an ingress L2/L3 reader 44. The ingress L2/L3 Reader 44 encapsulates the compressed, GPF-T mapped data into a standard WAN interface, i.e. Ethernet if connecting to a Layer 2 WAN network or IP if connecting to a Layer 3 WAN. The L2/L3 reader block 44 provides WAN transparency by retaining the common mapping to the WAN layer in use, e.g., L2 Ethernet with a VLAN tag or L3 IP for Multiprotocol Label Switching ("MPLS") for IP based transport, while maintaining a transparent traffic flow with compression and encryption.

The data is then encrypted for security purposes by the encryptor 46 using, for example, a 256 bit key. Although FIG. 3 shows the data as being encrypted after the L2/L3 reader 44, the encryption may alternatively be performed before the L2/L3 encapsulation. Additionally, compressed, GFP-T mapped, forward error corrected data received from a secondary FPGA 22 is also routed through the ingress L2/L3 reader 44. Encrypted data is then transferred through an ingress WAN interface 48 to the network port 26 for distribution across the wide-area network 16. It should be noted that in the exemplary application described herein, the ingress L2/L3 reader 44, encryptor 46, and ingress WAN interface 48 of the secondary FPGA 22 are not used. Although alternative embodiments of the present invention could enable these features, part of the value of the integrated network interface device 18 is that the traffic from multiple clients is aggregated onto a single (or perhaps two) WAN interface. For example, a small business with several employees may only want to pay for one WAN connection from a service provider and not four connections. The additional WAN connections may be too expensive and unnecessary as it is unlikely that all employees would need full bandwidth at the same time, hence the value of aggregation. The egress path basically operates in the opposite manner as that described for the ingress path. Encrypted data is received at the primary FPGA 20 through a network port 26 via an egress WAN interface 50. A decryptor 52 decodes the encrypted data, in a manner described in greater detail below, using a duplicate of the 256 bit key originally used to encode the data. The decrypted data is passed from the decryptor 52 through an egress L2/L3 reader 54 and separated by a deaggregator 55 to pass through to the data conversion block 32 of the primary FPGA 20, or through an egress expansion interface 56 to the data conversion block 32 of a secondary FPGA 22.

The decrypted data then passes through an egress forward error corrector 58 which is capable of reconstructing one missing data packet per FEC data block. The corrected data then passes through the GFP-T deMapper 60 which converts the GFP frames back to their native form. A decompressor 62 expands the data back to the original form as was initially transmitted by the originating client computer 14, and forwarded to a destination client computer 12 through an egress client interface 64.

For a given client port 24, at least two functions share one memory 28, 30. The GFP-T mapper 38 uses the memory 28, 30 in the ingress direction, and the decompressor 62 uses the memory 28, 30 in the egress direction. In alternative embodiments, other functions, such as the packet FEC 40 in the ingress direction could be assigned to share the same memory 28, 30.

Figure 4:
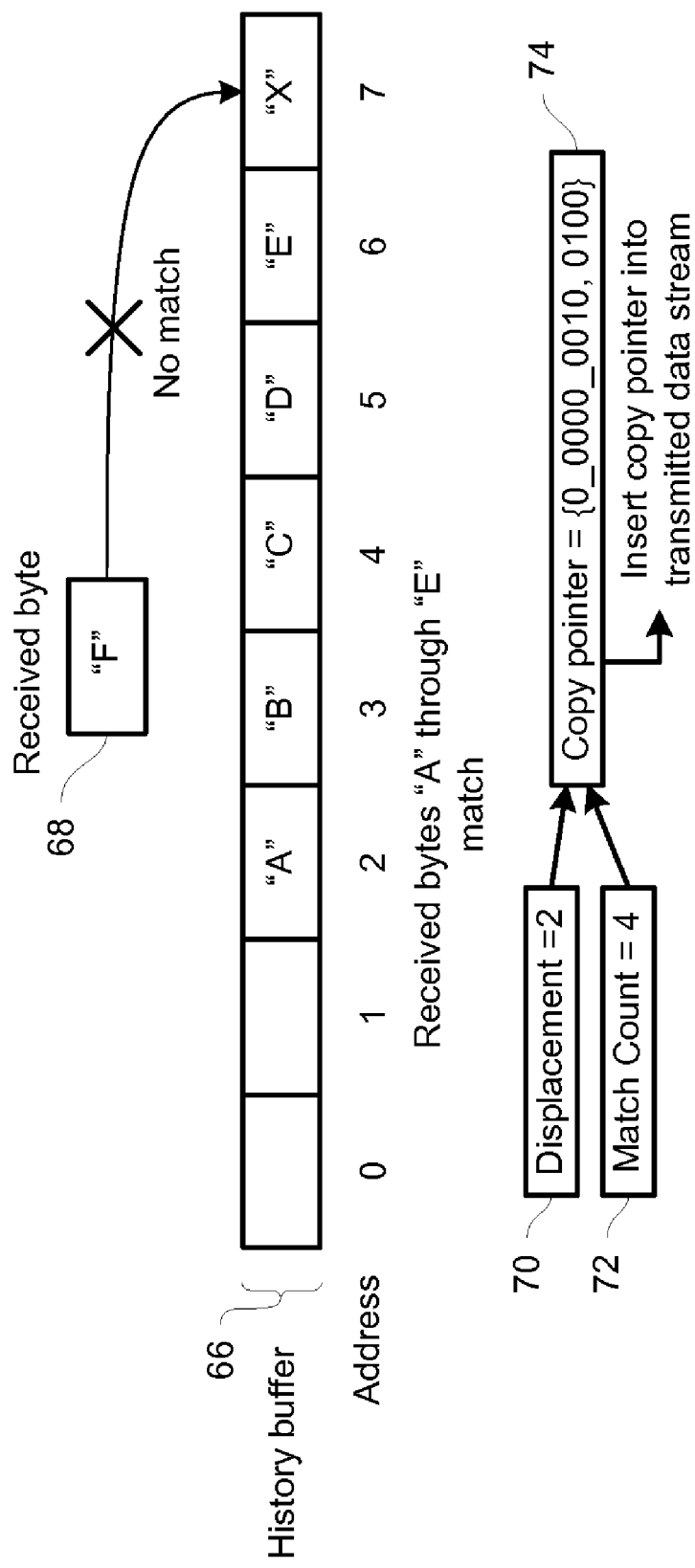
FIG. 4 is a data flow diagram illustrating the function of an exemplary data compressor constructed in accordance with the principles of the present invention.

Referring now to FIG. 4, a data flow diagram illustrates the functioning of an exemplary data compressor 36 constructed in accordance with the principles of the present invention. In accordance with one aspect, the compressor 36 uses an adaptive lossless data compression algorithm ("ALDC"). The compressor 36 contains or alternatively accesses a 512 byte history buffer which includes the last 512 bytes of incoming data that have passed through the compressor 36. The contents of the history buffer 66 wraps around after 512 bytes. When a new data byte 68 enters the compressor 36, the new data byte 68 is compared to the data contained in the history buffer 66 to determine if the contents of the new data byte 68 have been seen before. If the data 68 has been seen, a displacement field 70 is set which contains the position in the history buffer 66 where the matching data begins. The compressor 36 then compares the next incoming data byte to the next byte in the history buffer 66 to find a string of consecutive bytes. Each time a match is found, a match count indicator 72 is incremented by one. The match count indicator 72 may be from 2 to 12 bits long. A copy pointer 74 containing the displacement field 70 and the match count indicator 72 is inserted into the data stream in place of the actual data bytes. The size of the copy pointer 74 is smaller than the actual data series, thereby reducing the amount of data that is actually transmitted over the WAN 16 to a receiving client computer 14. When the data stream is decompressed at the receiving side, the decompressor 62 replaces the copy pointer 74 by inserting the contents of the data bytes stored in the history buffer 66 corresponding to the bytes indicated in the copy pointer 74.

For the example shown in FIG. 4, the incoming data has matched the data contained in the history buffer 66 beginning with the second byte in the buffer, such that the displacement field equals 2. The next four bytes received matched the consecutive bytes of the history buffer 66. The fifth received byte contains "F" while the fifth consecutive byte in the history buffer 66 contains "X". Therefore, the contents of bytes 2 through 6 are replaced in the outgoing data stream by a copy pointer 74 containing the value {0_0000_0010, 0100}. Of course, it is contemplated that other forms of compression can be implemented.

Figure 5:
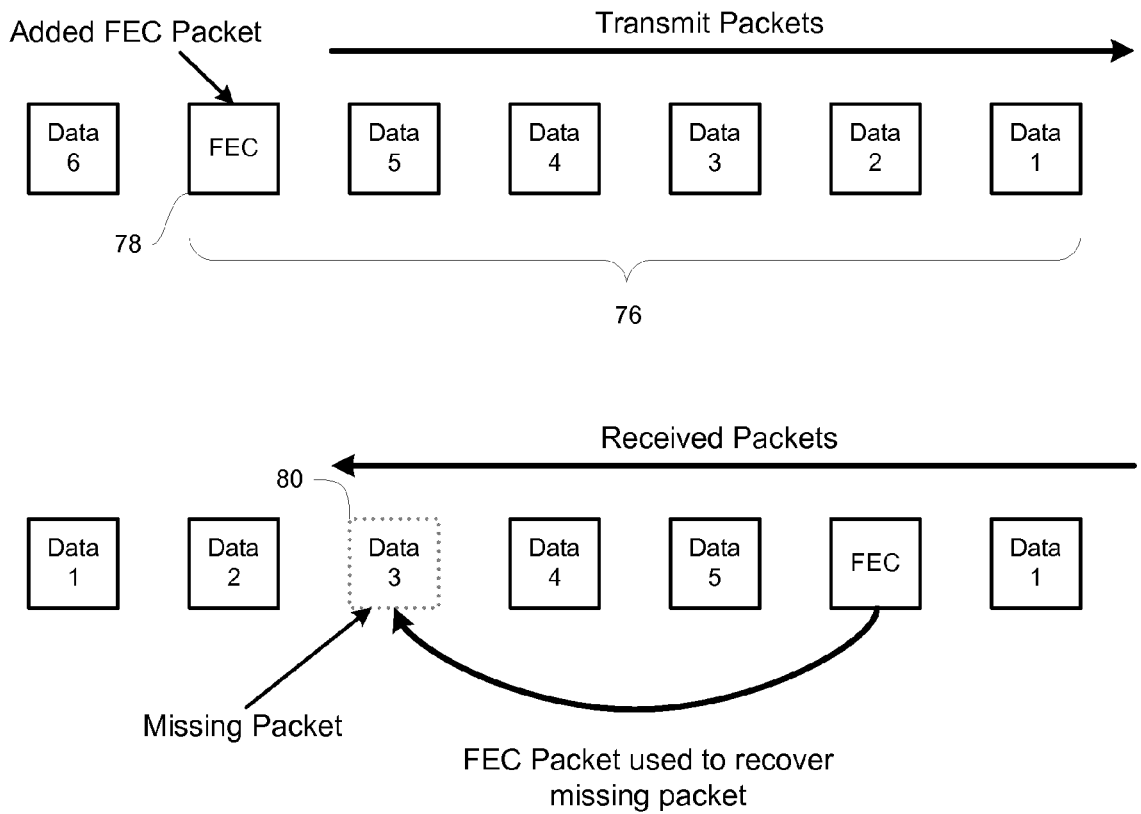
FIG. 5 is a data flow diagram illustrating the function of an exemplary forward error corrector constructed in accordance with the principles of the present invention.

Referring now to FIG. 5, a data flow diagram illustrates the function of an exemplary forward error corrector 40 constructed in accordance with the principles of the present invention. The forward error corrector 40 provides end-to-end protection against packet loss over any network, e.g., layer1, layer 2 or layer 3. Any errors in a Layer 1, 2 or 3 network can result in corruption of data packets. This, in turn, means that the corrupted data packet may be dropped by the time the data arrives at the egress WAN interface, either by an intermediate device in the network or the egress WAN interface itself. Packet FEC can then re-construct the missing packet. Forward error correction embeds information in a standalone Ethernet or IP packet via an exclusive "or" ("XOR") of the preceding data to allow the far end receiving device to replace any of the missing data within a group of N packets. Thus, forward error correction ensures that Ethernet or IP networks with some amount of packet loss can experience an overall reduction in the packet loss on a given link using a combination of a transmitting and a receiving device. The forward error correction prevents a full round trip over the WAN link which increases utilization caused by application re-transmissions common with TCP based applications. This capability is important for any application that can not tolerate loss of data in a stream like video broadcast or VOIP applications. This solution avoids the need for modifying the end points in the network with additional packet recovery logic and allows a transparent network based solution to packet loss recovery.

Basically, in any group of N frames forming an FEC data block 76, an N+1 frame 78 is added to the data block 76 which contains the sum of the contents of all the frames within the block. Therefore, if any one frame 80 within the block is lost, the frame may be reconstructed simply by adding the contents of the remaining N−1 frames and subtracting the sum from the contents of the N+1 frame 78. Any given frame could potentially be lost in the network due to a variety of reasons, such as Ethernet Frame Check Sequence ("FCS") errors or signal quality. Multiple consecutive frame loss within an FEC data block cannot be recovered. However, the number of frames per data block may be adjusted from, for example, 2-10 frames per block. By implementing forward error correction methods on the WAN interface 18, missing packets 80 may be transparently replaced without having to retransmit the data.

Figure 6:
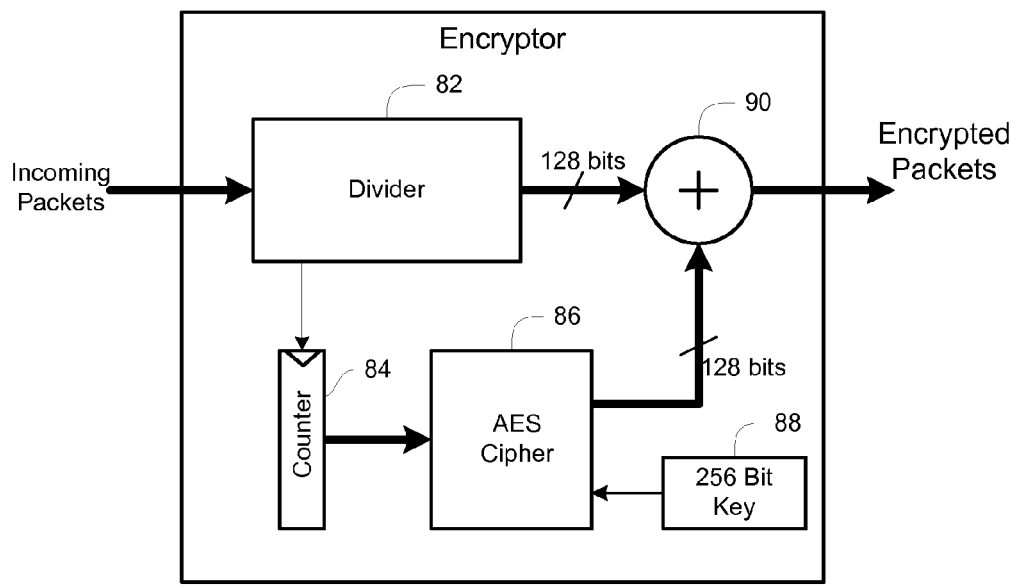
FIG. 6 is a block diagram of an exemplary encryptor constructed in accordance with the principles of the present invention.

A block diagram of an exemplary encryptor 46, constructed in accordance with the principles of the present invention, is shown in FIG. 6. The encryptor 46 of the present invention operates using a counter mode. A divider 82 divides the incoming data packets into 16 byte, i.e., 128 bit, segments. A counter 84 assigns each segment a 128 bit counter value which is incremented sequentially with the received data segments. Each counter value is then encrypted using an Advanced Encryption Standard ("AES") cipher 86 with a 256 bit key 88. The resulting counter value is then passed through an XOR logic gate 90 along with its associated data segment to generate the encrypted data. Of course, other forms of encryption can be implemented.

Figure 7:
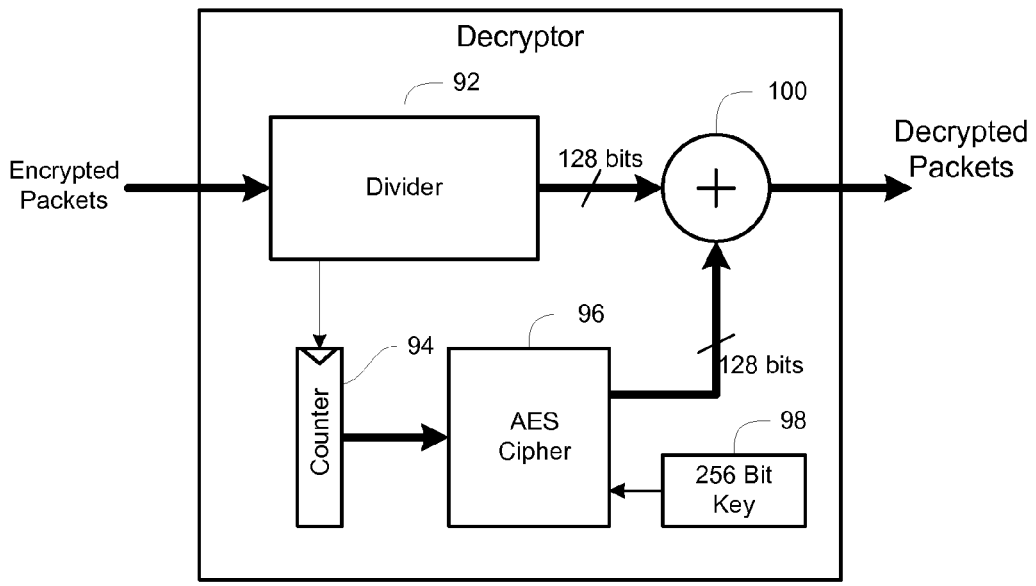
FIG. 7 is a block diagram of an exemplary decryptor constructed in accordance with the principles of the present invention.

FIG. 7 shows a block diagram of an exemplary decryptor 52 constructed in accordance with the principles of the present invention. The decryptor 52 operates in a similar manner as the encryptor 46. For the decryptor 52, a divider 92 divides the received packets into 16 byte segments and each segment is assigned a 128 bit counter value from a local counter 94. Each counter value is then encrypted using the AES Cipher 96 with a 256 bit key 98. The resulting encrypted count value is then combined with its accompanying data segment through an XOR logic gate 100 to generate decrypted data.

Security may be enhanced by supporting rolling keys, which allows the operator to change the key at some regular interval while the WAN interface 18 is still in service, i.e., carrying live traffic. The WAN interface 18 supports two banks, e.g., A or B, of keys, such that only one bank is active at a time. The keys on the inactive bank may be modified at any time.

Figure 8:
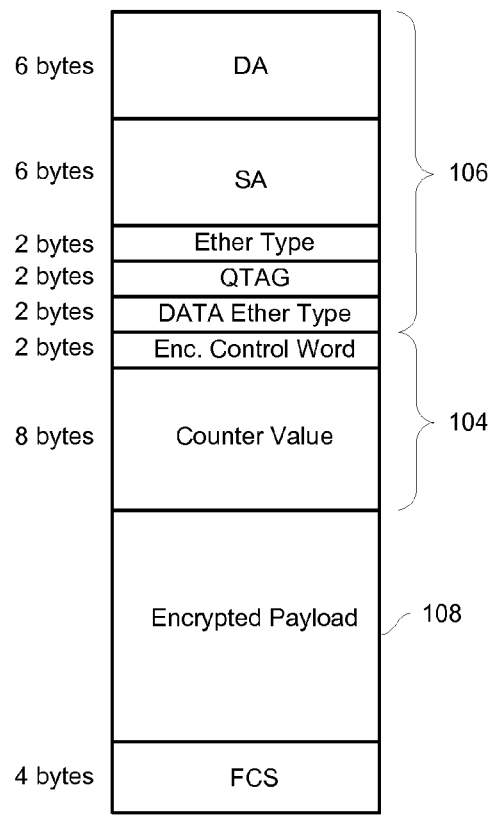
FIG. 8 is a diagram illustrating an exemplary data structure of outgoing data packets constructed in accordance with the principles of the present invention.

An exemplary data structure for an encrypted packet 102 is shown in FIG. 8. The above encryption/decryption method works as long as the counter values in both the encryption side and the decryption side remain in sync with each other. Synchronization may be achieved by sending the lower eight bytes of the first counter value associated with each encrypted packet in an encryption header 104 which may be inserted after the L2/L3 headers 106 of the packet. The encryption header 104 includes the lower eight bytes of the counter value and a 2-byte control word. One bit of the control word is used to indicate which key bank, e.g., A or B, is active. The remaining bits are reserved for future use. The encrypted payload 108 follows after the encryption header 104. The encrypted payload 108 includes the compressed data and any inserted forward error correction packets.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A network interface device comprising:
   at least one physical memory;
   at least one client port, the at least one client port receiving data blocks from at least one first client computer system, each of the data blocks containing a quantity of bits;
   at least one processor communicatively coupled to the at least one client port, the processor accessing the at least one physical memory to:

temporarily store the data blocks in the at least one physical memory;
interact with the at least one physical memory to compress the data blocks to reduce the quantity of bits and produce a first set of compressed data blocks; and
interact with the at least one physical memory to encrypt the compressed data blocks to produce encrypted frames; and
at least one network port, communicatively coupled to the processor, the at least one network port transmitting the encrypted frames to a communication network;
the at least one processor including a primary device to produce the first set of compressed data blocks derived from data from a first client port, and a secondary device communicatively coupled to the primary device to produce a second set of compressed data blocks derived from data from a second client port, the primary device aggregating the first and second compressed data blocks prior to encrypting, the primary device including a first transparent generic frame procedure ("GFP-T") mapper to map the first set of compressed blocks into transparent generic frames, the secondary device including a second GFP-T mapper to map the second set of compressed blocks into transparent generic frames, the mapping occurring prior to aggregating the first and second compressed data blocks.

2. The network interface device of claim 1, wherein the data blocks are structured according to at least two different protocols, the processor further:
aggregates the data blocks structured according to at least two different protocols;
inserts forward error correction packets into the GFP-T frames; and
delivers the encrypted frames to a common network port for transmission.

3. The network interface device of claim 2, wherein the processor further:
receives encrypted data frames through a communication network;
decrypts the encrypted data frames to reveal compressed data frames;
decompresses the compressed data frames into data blocks substantially identical to data blocks transmitted by a second client computer system; and
transmits the data blocks substantially identical to data blocks transmitted by a second client computer system to the at least one first client computer system.

4. The network interface device of claim 3, wherein prior to decompressing, the processor further:
reconstructs one missing data packet from at least one compressed data frame to reveal GFP-T frames; and
demaps the GFP-T frames.

5. The network interface device of claim 4, wherein the one physical memory is divided into four logical units.

6. The network interface device of claim 4, wherein the processor includes:
one GFP-T mapper per bi-directional client port, the GFP-T mapper mapping the compressed data blocks into transparent generic frame procedure ("GFP-T") frames; and
one decompressor per bi-directional client port, the decompressor decompressing the compressed data frames into data blocks substantially identical to data blocks transmitted by a second client computer system,
wherein each GFP-T mapper and each decompressor share one physical memory.

7. The network interface device of claim 1, wherein the at least one client port operates at a first data rate, and the processor accesses the physical memory at a rate at least four times greater than the first data rate.

8. A method for preparing data for transportation over a communication network using a single device, the method comprising:
receiving, at a first device, data blocks from at least one first client computer system, each of the data blocks containing a quantity of bits;
compressing the data blocks to reduce the quantity of bits and produce a first set of compressed data blocks; mapping the first set of compressed blocks into transparent generic frames using a first transparent generic frame procedure ("GFP-T")mapper; receiving, at the first device from a second device coupled to a second client computer system, a second set of compressed data blocks; mapping the second set of compressed blocks into transparent generic frames using a second GFP-T mapper; aggregating the mapped first and second sets of compressed data blocks at the first device; encrypting the aggregated mapped first and second sets of compressed data blocks to produce encrypted frames; and
transmitting the encrypted frames to a communication network.

9. The method of claim 8, wherein the first and second compressed data blocks are structured according to at least two different protocols, the method further comprising:
inserting forward error correction packets into the GFP-T frames; and
after aggregating the first and second sets of compressed data blocks, delivering the encrypted frames to a common network port for transmission to the communication network.

10. The method of claim 9, further comprising:
receiving encrypted data frames through a communication network;
decrypting the encrypted data frames to reveal compressed data frames;
decompressing the compressed data frames into data blocks substantially identical to data blocks transmitted by a second client computer system; and
transmitting the data blocks substantially identical to data blocks transmitted by a second client computer system to the first client computer system.

11. The method of claim 10, further comprising:
reconstructing one missing data packet from at least one compressed data frame to reveal GFP-T frames; and
demapping the GFP-T frames.

12. A field-programmable device, comprising:
an ingress client interface, the ingress client interface receiving data blocks from a first client computer system, the data blocks containing a quantity of bits;
a compressor communicatively coupled to the ingress client interface, the compressor compressing the data blocks to reduce the quantity of bits to produce a first set of compressed data blocks; a first transparent generic frame procedure ("GFP-T) mapper to map the first set of compressed blocks into transparent generic frames:
an aggregator to aggregate a second set of GFP-T mapped compressed data blocks from an external device with the first sets of compressed GFP-T mapped data blocks:
an encryptor communicatively coupled to the compressor, the encryptor encrypting the aggregated compressed GFP-T mapped data blocks to produce encrypted frames; and an ingress network interface communicatively coupled to the encryptor, the ingress network interface transmitting the encrypted frames to a communication network.

13. The field-programmable device of claim 12, further comprising:
an egress network interface, the egress network interface receiving encrypted data frames through a communication network;
a decryptor communicatively coupled to the egress network interface, the decryptor decrypting the encrypted data frames to reveal compressed data frames;
a decompressor communicatively coupled to the decryptor, the decompressor decompressing the compressed data frames into data blocks substantially identical to data blocks transmitted by a second client computer system; and
an egress client interface communicatively coupled to the decompressor, the egress client interface transmitting the data blocks identical to data blocks transmitted by a second client computer system to the first client computer system.

14. The field-programmable device of claim 13, further comprising:
an egress forward error corrector communicatively coupled to the decryptor, the egress forward error corrector reconstructing one missing data packet from at least one compressed data frame to reveal GFP-T frames; and
a GFP-T demapper communicatively coupled to the egress forward error corrector, the GFP-T demapper demapping the GFP-T frames.

15. The field-programmable device of claim 14, further comprising:
an ingress forward error corrector communicatively coupled to the GFP-T mapper, the ingress forward error corrector inserting forward error correcting packets into the GFP-T frames;
and wherein the second set of compressed blocks are mapped by a GFP-T mapper and forward error corrected before being aggregated by the aggregator.

16. The field-programmable device of claim 15, further comprising:
at least two bi-directional client ports, wherein the at least two bi-directional client ports access a same physical memory; and wherein the one physical memory is divided into four logical units.

17. The field-programmable device of claim 12, wherein the ingress client interface and the egress client interface operate at a first data rate, and the field-programmable array accesses a physical memory at a rate at least four times greater than the first data rate.

18. The field-programmable device of claim 13, further comprising a de-aggregator to de-aggregate the compressed frames to a first set of compressed data frames and a second set of compressed data frames, wherein the first set of compressed data frames is forwarded to the decompressor and the second set of compressed data frames is forwarded to the external device.

* * * * *